No. 769,317. PATENTED SEPT. 6, 1904.
J. K. McCAHILL.
LOOSE PULLEY MECHANISM FOR LINE SHAFTS.
APPLICATION FILED OCT. 24, 1903.
NO MODEL. 2 SHEETS—SHEET 1.
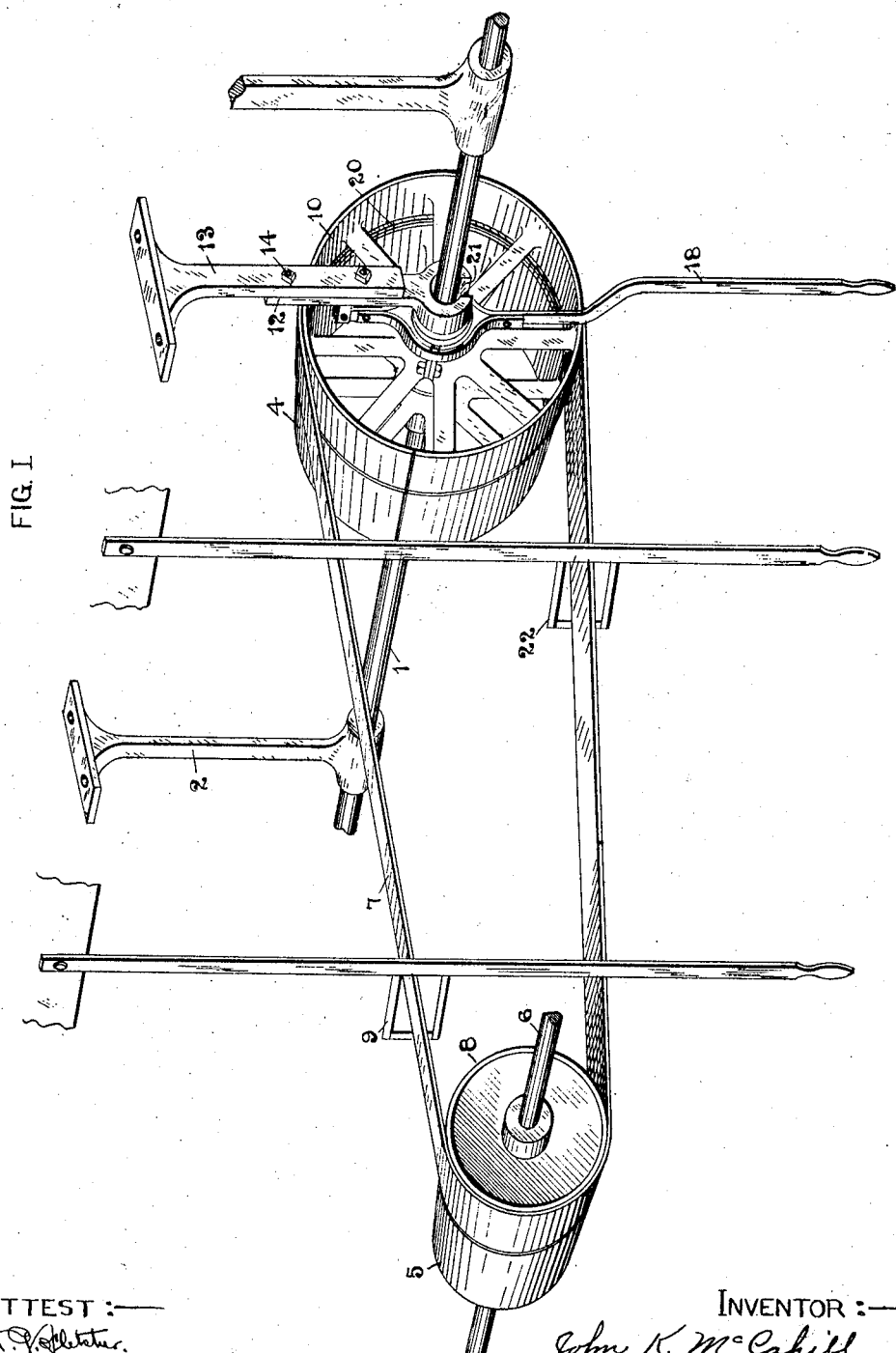
FIG. I.
ATTEST:
INVENTOR:
John K. McCahill
BY Higdon & Longan & Hopkins
ATTY'S No. 769,317. PATENTED SEPT. 6, 1904.
J. K. McCAHILL.
LOOSE PULLEY MECHANISM FOR LINE SHAFTS.
APPLICATION FILED OCT. 24, 1903.
NO MODEL. 2 SHEETS—SHEET 2.
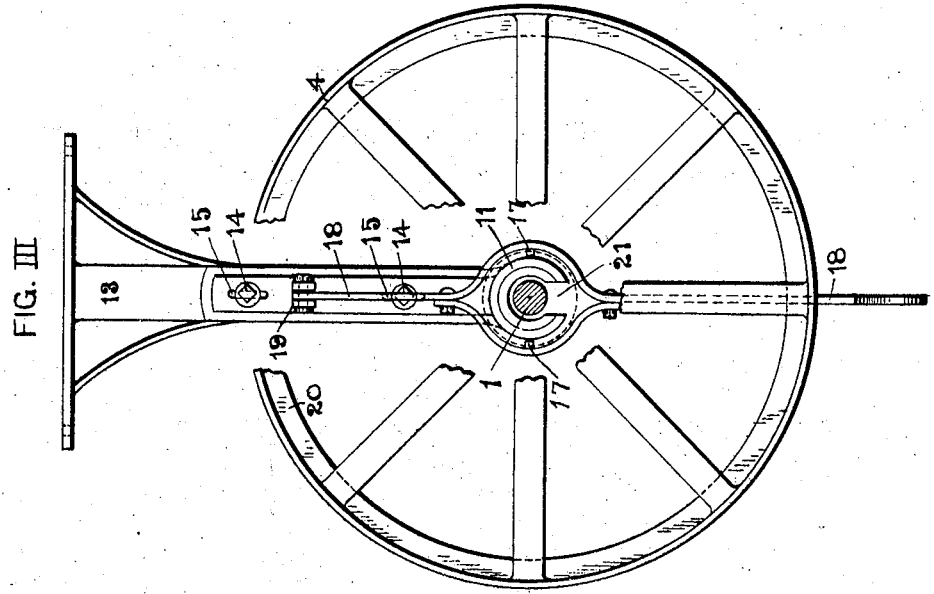
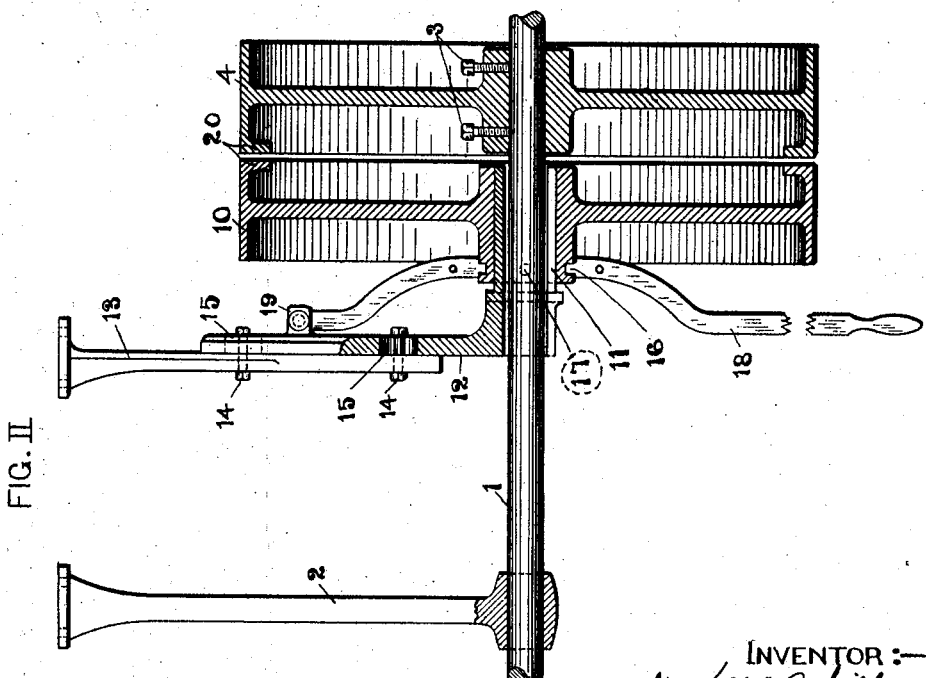
ATTEST:—
INVENTOR:—
John K. McCahill
By Higdon & Longan & Hopkins
ATTY'S No. 769,317.

Patented September 6, 1904.

UNITED STATES PATENT OFFICE.

JOHN K. McCAHILL, OF ST. LOUIS, MISSOURI.

LOOSE-PULLEY MECHANISM FOR LINE-SHAFTS.

SPECIFICATION forming part of Letters Patent No. 769,317, dated September 6, 1904.

Application filed October 24, 1903. Serial No. 178,423. (No model.)

*To all whom it may concern:*

Be it known that I, JOHN K. MCCAHILL, a citizen of the United States, residing at St. Louis, State of Missouri, have invented certain new and useful Improvements in Loose-Pulley Mechanism for Line-Shafts, of which the following is a specification containing a full, clear, and exact description, reference being had to the accompanying drawings, forming a part hereof.

My invention relates to an improved loose-pulley mechanism for line-shafts; and it consists in the novel subject-matter hereinafter described and claimed.

The object of my invention is to provide an improved device whereby loose pulleys may be applied to line-shafts in such manner that when the belt is thrown upon the loose pulley of the line-shaft all belts will thereby be stopped and the wear heretofore caused by running belts, loose pulleys, and counter-shafts will be prevented.

In the drawings, Figure 1 is a perspective view of a mechanism embodying my invention. Fig. 2 is a sectional side elevation of the line-shaft and devices connected therewith. Fig. 3 is a sectional end view of the devices shown in Fig. 2.

1 indicates the line-shaft, which may be supported as usual by common hangers, such as 2, and fixed upon the shaft by means of set-screws 3 or other fastenings is a tight pulley 4, which is adapted to drive a tight pulley 5 upon the counter-shaft 6 by means of a belt 7. Mounted adjacent the counter-shaft for directing the belt upon the tight pulley 5 or the counter-shaft loose pulley 8 is a common belt-shifter 9.

10 indicates the line-shaft loose pulley, which, it will be observed, is not mounted upon the line-shaft, but is mounted upon a tubular arm 11, projecting laterally from the vertical shank 12 of the loose-pulley hanger 13, which latter may be located at any suitable point and bolted in position either to the ceiling above the line-shaft 1, or it may be bolted to a beam or vertical post, so that said hanger 13 will project close to the said line-shaft. The shank 12 is adjustably connected to said hanger 13 by means of bolts 14, engaging said hanger and slots 15, which latter are formed in the said shank.

The line-shaft loose pulley 10 is provided with an annular groove 16 in its hub, which is engaged by opposite pins 17, projecting from the opposite curved parts of the hand-lever 18. Said hand-lever is pivoted at its upper end to a bracket 19, projecting from said shank 12, so that when the lower end of said lever is moved in a direction parallel to said line-shaft said loose pulley 10 will be moved a corresponding distance upon the said tubular arm 11. The said loose pulley 10 and the tight pulley 4 are provided with marginal inwardly-projecting flanges 20 upon their adjacent edges and which flanges are adapted to act as friction-surfaces when the flange of said loose pulley is forced into contact with the flange of said tight pulley for the purpose hereinafter mentioned.

The pulleys 4 and 10 are preferably of the well-known "split-pulley" form, so that they may be readily mounted in position without taking down the line-shaft.

It will be observed that the tubular arm 11 is open upon its under side, as indicated by the numeral 21, and by means of such construction the said arm may be readily passed over the shaft without disturbing the same. It will be further observed that said tubular arm does not come in contact with the said shaft, but is supported a distance therefrom by means of the shank 12 and its hanger 13, so that no friction whatever is imposed upon said shaft by the application of the loose pulley 10.

22 indicates a common belt-shifter applied to the belt 7 adjacent said loose pulley 10.

The operation is as follows: The belt is shown in Fig. 1 upon the loose pulleys 8 and 10, and when the same is in such position the line-shaft 1 and the tight pulley 4 may freely continue to revolve without producing any effect on the loose pulley 10 or the belt 7 and of course without affecting the counter-shaft 6 or the machine which may be driven thereby. By this construction all wear and tear of all belts and loose pulleys is prevented when the machine driven by the tight pulley 4 is not in use. Heretofore this has been impossible, inasmuch as the line-shaft had no loose pulley applied to it, and the consequence was that the belt connecting the line-shaft with the counter-shaft had to be in continuous motion whether the machine driven by it was in use or not. This caused much wear of the belt and loose pulley of the counter-shaft, and such loose pulley has also made disagreeable clattering, and such a construction has necessitated frequent costly repairs. When it desired to throw the belt 7 onto the tight pulley 4, the operator first grasps the hand-lever 18 and with it forces the loose pulley 10 into contact with the tight pulley 4, the friction-flanges 20 of said two pulleys acting as a friction-clutch, and motion will thereby be quickly communicated from said tight pulley 4 to the said loose pulley, and the latter will be caused to revolve with said tight pulley.

After said loose pulley has attained about the same velocity as that of the tight pulley the operator then manipulates the belt-shifter 22, and thereby throws the belt onto the tight pulley 4, after which said belt may be manipulated in the usual manner by means of the belt-shifter 9 in starting and stopping the machine driven by the counter-shaft 6. After the belt has been thrown upon the tight pulley 4 the operator will of course release the hand-lever 18, and the loose pulley 10 will stop. After the machine driven by the counter-shaft 6 has accomplished its work and it is desired to stop the same for any length of time the operator will first throw the belt 7 onto the loose pulley 8, and then by means of the belt-shifter 22 he will throw said belt onto the line-shaft loose pulley 10, where it will rest until it is desired to again start the machine.

The belt 7 need not be shifted from the line-shaft tight pulley 4 to the loose pulley 10, and vice versa, each time it is desired to start or stop the machine, as said belt can be permitted to run for any desired length of time upon the tight pulley 4, and the machine can be started and stopped by manipulating the belt-shifter 9, and thereby running the belt onto the tight pulley 5 or loose pulley 8 of the counter-shaft, as the operator may desire, in order to start or stop the machine driven by said counter-shaft.

I claim—

1. A loose pulley applied to a line-shaft, in combination with a tight pulley on said shaft, said tight pulley being provided with a friction device for causing said loose pulley to temporarily engage said tight pulley, a loose-pulley hanger upon which said loose pulley rotates, said hanger being supported clear of said shaft, a hand-lever pivoted to said hanger and connected to said loose pulley for moving the same axially; a counter-shaft having loose and tight pulleys, a belt, a belt-shifter adjacent said counter-shaft, and a separate belt-shifter adjacent said line-shaft pulleys, substantially as described.

2. In a loose-pulley mechanism for line-shafts, the combination with a line-shaft and a tight pulley; of a hanger; a shank adjustably connected to the hanger; a tubular arm 11 projecting laterally from said shank, said tubular arm being open on the lower side so that the shaft may be inserted upwardly through said opening; a loose pulley slidingly mounted upon said arm beside the tight pulley upon the shaft; there being a friction-flange upon the tight pulley; and a friction-flange upon the loose pulley; and a hand-lever pivotally mounted to engage and move the loose pulley to bring said friction-flanges together, substantially as described.

In testimony whereof I have signed my name to this specification in presence of two subscribing witnesses.

JOHN K. McCAHILL.

Witnesses:
ALFRED A. EICKS,
JOHN C. HIGDON.